(12) United States Patent
Park et al.

(10) Patent No.: US 7,335,388 B2
(45) Date of Patent: Feb. 26, 2008

(54) BREAD MAKER AND METHOD OF CONTROLLING THE SAME

(75) Inventors: Jae-ryong Park, Suwon (KR); Yong-hyun Kwon, Suwon (KR); Chul Kim, Anyang (KR); Tae-uk Lee, Suwon (KR); Han-jun Sung, Suwon (KR); Jang-woo Lee, Suwon (KR); Dong-bin Lim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 278 days.

(21) Appl. No.: 10/805,351

(22) Filed: Mar. 22, 2004

(65) Prior Publication Data

US 2004/0221736 A1    Nov. 11, 2004

(30) Foreign Application Priority Data

May 7, 2003    (KR) ...................... 10-2003-0029066

(51) Int. Cl.
*A21D 6/00* (2006.01)
*A23C 3/00* (2006.01)
*A23C 9/14* (2006.01)

(52) U.S. Cl. ........................ 426/504; 426/243; 426/523
(58) Field of Classification Search .................. 99/348, 99/352, 353, 326, 331, 337; 426/243, 391, 426/496, 504, 512, 523
See application file for complete search history.

(56) References Cited

U.S. PATENT DOCUMENTS 4,550,654 A    11/1985 Hedenberg
4,803,086 A    2/1989 Hedenberg
5,117,079 A *  5/1992 Morino et al. ............... 219/726
5,146,840 A *  9/1992 Hedenberg .................... 99/328
5,373,145 A    12/1994 Endo et al.
5,549,038 A    8/1996 Kolvites
5,631,033 A    5/1997 Kolvites
5,968,402 A    10/1999 Lee
6,029,563 A    2/2000 Nakagawa et al.
6,845,706 B2 * 1/2005 Kim et al. ..................... 99/348
2004/0221734 A1    11/2004 Lee et al.

(Continued)

FOREIGN PATENT DOCUMENTS

JP    63-197822    8/1988

(Continued)

*Primary Examiner*—Reginald L. Alexander
(74) *Attorney, Agent, or Firm*—Staas & Halsey LLP

(57) ABSTRACT

A bread maker including a main body having an oven compartment with a front opening, a door to open and close the front opening of the oven compartment, a pair of kneading drums spaced apart from each other inside the oven compartment and winding a mixing bag filled with ingredients for bread thereon, a drum driver driving the kneading drums to rotate, a heater heating the inside of the oven compartment, and a heater driver driving the heater to operate. The bread maker includes a door sensor sensing whether the door is open or closed; and a controller controlling the drum driver and the heater driver to suspend the kneading drum and the heater, respectively, when the door sensor senses that the door is open. With this configuration, the bread maker and a method of controlling the same, suspends heaters and kneading drums when a door is open while the bread maker operates, thereby increasing safety and decreasing loss of heat and electrical energy.

10 Claims, 4 Drawing Sheets

U.S. PATENT DOCUMENTS

| | | |
|---|---|---|
| 2004/0221738 A1 | 11/2004 | Lim et al. |
| 2004/0221741 A1 | 11/2004 | Park et al. |
| 2004/0223409 A1 | 11/2004 | Lee et al. |
| 2004/0244601 A1 | 12/2004 | Lee et al. |

FOREIGN PATENT DOCUMENTS

| | | |
|---|---|---|
| JP | 64-500320 | 2/1989 |
| JP | 02-134114 | 5/1990 |
| JP | 3-13741 | 1/1991 |
| JP | 4-313623 | 11/1992 |
| JP | 6-272871 | 9/1994 |
| JP | 6-307651 | 11/1994 |
| JP | 7-151337 | 8/1995 |
| JP | 9-89260 | 4/1997 |
| JP | 2000-93318 | 4/2000 |
| JP | 2001-523444 | 11/2001 |
| JP | 2002-85263 | 3/2002 |
| KR | 1988-7000638 | 4/1988 |
| KR | 1994-3713 | 5/1991 |
| KR | 1994-979 | 8/1992 |
| KR | 1997-11179 | 7/1997 |
| KR | 1999-31373 | 5/1999 |
| WO | 99/25476 | 5/1999 |
| WO | WO 99/25467 | 5/1999 |

\* cited by examiner

BREAD MAKER AND METHOD OF CONTROLLING THE SAME

CROSS-REFERENCE TO RELATED APPLICATIONS

This application claims the benefit of Korean Patent Application No. 2003-29066, filed May 7, 2003, in the Korean Intellectual Property Office, the disclosure of which is incorporated herein by reference.

BACKGROUND OF THE INVENTION

1. Field of the Invention

The present invention relates to a bread maker and a method of controlling the same, and more particularly, to a bread maker and a method of controlling the same, which suspends heaters and kneading drums when a door is open while the bread maker operates, thereby increasing safety and decreasing loss of heat and electrical energy.

2. Description of the Related Art

Generally, a bread maker automatically performs kneading, leavening, and baking of bread dough, and provides fresh bread to a user, so that a user only needs to put ingredients in the bread maker. For example, a bread maker disclosed in Korean Patent First Publication No. 1988-7000638 includes a pair of parallel kneading drums at upper and lower parts of an oven compartment that reverse rotary direction periodically, a baking tray between the pair of kneading drums, a heater heating the inside of the oven compartment, a bar code reader, etc.

In the bread maker, upper and lower ends of a mixing bag filled with flour, water, etc., are attached to the upper and lower kneading drums, and then the mixing bag is reciprocated up and down for a predetermined period of time, thereby kneading the dough in the mixing bag.

After completing the kneading of the dough, the mixing bag is automatically separated from the upper kneading drum, and wound on the lower kneading drum, with the dough being squeezed out of the mixing bag and into the baking tray. Thereafter, the heater heats the inside of the oven compartment, thereby leavening and baking the dough for a predetermined period of time.

The bread is made according to a bar code that is printed on or applied to the mixing bag that includes information on kneading time, leavening time, baking time, etc., for a particular recipe. That is, the bar code is read by the bar code reader and the read data are transmitted to a controller, so that the controller controls the kneading drums, the heater, etc., on the basis of the read data.

However, in the conventional bread maker, while the bread is baked, when a user such as children or older persons carelessly opens a door without becoming aware that the bread is being baked, the heater is being continuously operated. In this case, even if the heater is being continuously operated, the bread is not completely baked after a lapse of a predetermined period of time because heat goes out of the oven compartment, thereby wasting heat energy. Further, at this time, the heater is not properly controlled, so that the bread may be burned according as the dough excessively rises and contacts the heater.

Further, when the door is open while the bread maker operates, children or older persons are likely to not become aware that the kneading drums rotate and the heaters operate, so that a user is in danger.

SUMMARY OF THE INVENTION

Accordingly, it is an aspect of the present invention to provide a bread maker and a method of controlling the same, which suspends heaters and kneading drums when a door is open while the bread maker operates, thereby increasing safety and decreasing loss of heat and electrical energy.

Additional and/or other aspects and advantages of the invention will be set forth in part in the description which follows and, in part, will be obvious form the description, or may be learned by practice of the invention.

BRIEF DESCRIPTION OF THE DRAWINGS

These and/or other aspects and advantages of the present invention will become apparent and more readily appreciated from the following description of the preferred embodiments, taken in conjunction with the accompany drawings of which.

DETAILED DESCRIPTION OF THE PREFERRED EMBODIMENTS

Figure 1:
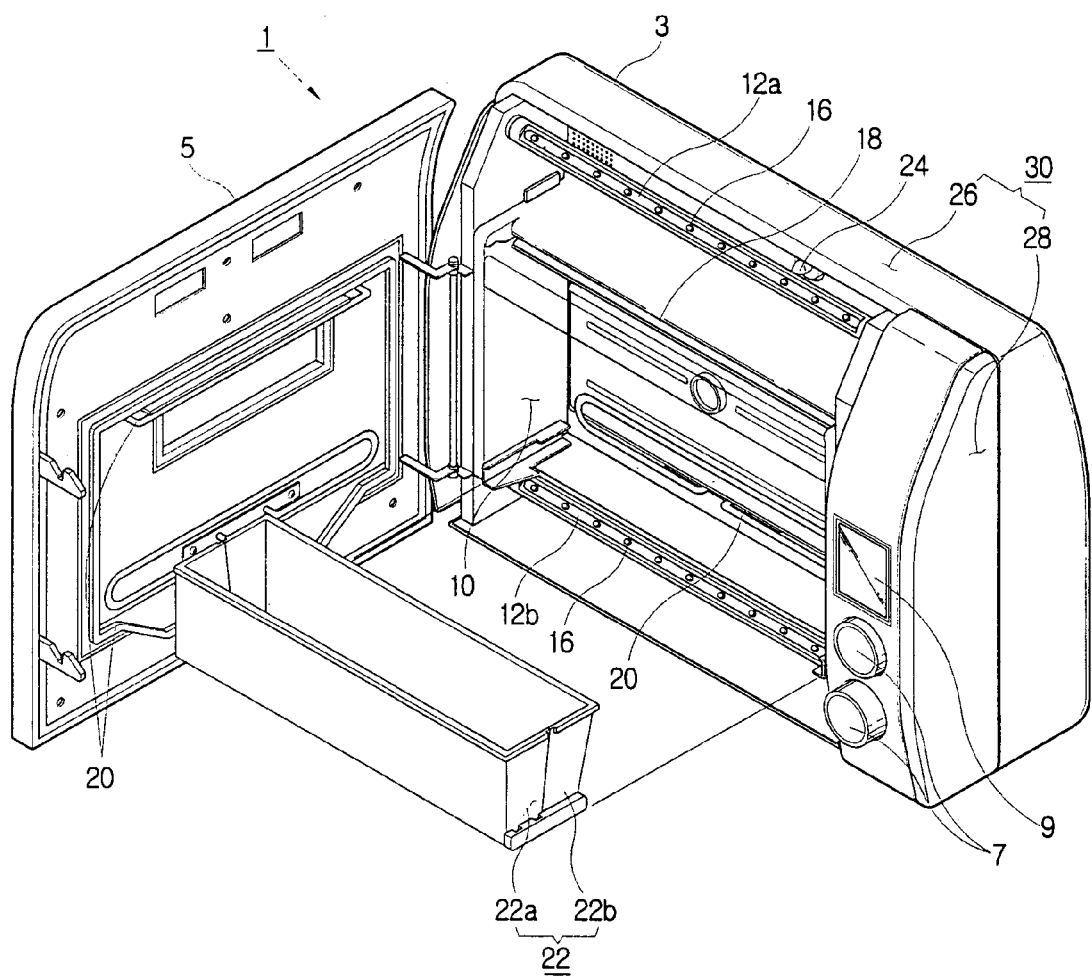
FIG. 1 is a perspective view of a bread maker according to an embodiment of the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

As shown in FIG. 1, a bread maker 1 according to the present invention comprises a main body 3 having an oven compartment 10 and a component compartment 30, a door 5 provided in the front of the main body 1 to open and close a front opening of the oven compartment 10, an operation selecting part 7 provided in a front side of the main body 3 and allowing a user to select an operation of the bread maker 1, and a display part 9 displaying an operating state of the bread maker 1.

In upper and lower parts of the oven compartment 10 are provided an upper kneading drum 12a and a lower kneading drum 12b, which are disposed in parallel and alternate clockwise and counterclockwise rotations. On the upper and lower kneading drums 12a and 12b are wound opposite ends of a mixing bag (not shown) filled with ingredients for the bread, respectively. Each kneading drum 12a and 12b has a plurality of holding projections 16 protruding along a lengthwise direction thereof to hold the opposite ends of a mixing bag, so that the mixing bag can be attached to the kneading drums 12a and 12b.

In a lower part of the oven compartment 10, there is a baking tray 22 in which the kneaded dough is baked between the upper and lower kneading drums 12a and 12b. The baking tray 22 includes a first tray 22a and a second tray 22b, each having an "L"-shaped section symmetrical to one another that combine into a box shape having an open top.

In an upper part of the oven compartment 10, a pair of dough-blocking members 18 is provided between the upper kneading drum 12a and the baking tray 12b to knead the dough contained in the mixing bag within the baking tray 22, preventing the dough from moving outside the baking tray 22.

At upper and lower parts of the inside walls of the oven compartment 10 and the door 5 are provided heaters 20 to heat the inside of the oven compartment 10.

Figure 2:
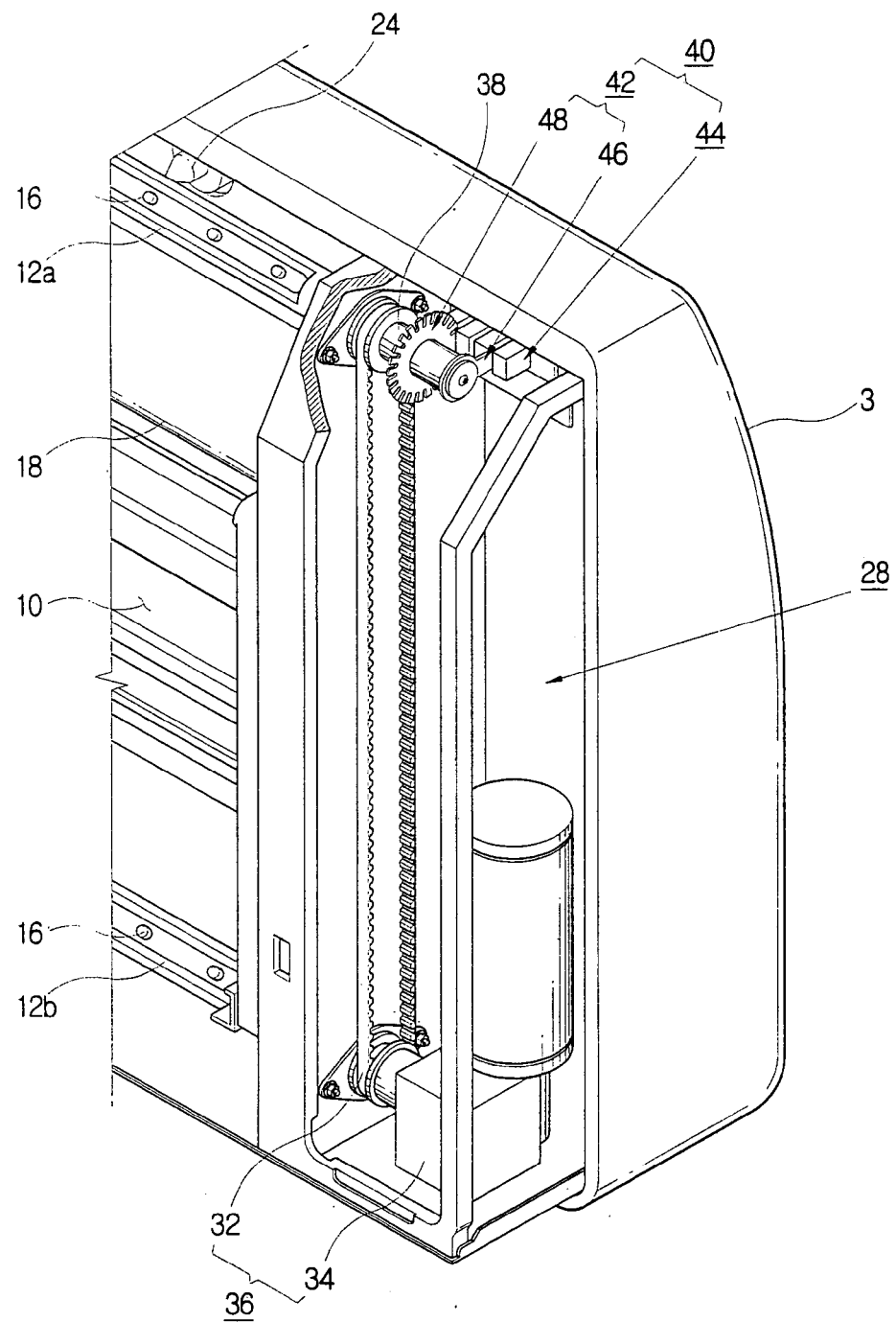
FIG. 2 is a cut open perspective view of a component compartment of FIG. 1.

The component compartment 30 includes a first component compartment 28 placed beside the oven compartment 10 and a second component compartment 26 placed behind the oven compartment 10. As shown in FIG. 2, inside the first component compartment 28 is provided a drum driver 36 that rotates the upper and lower kneading drums 12a and 12b in clockwise and counterclockwise directions. Inside the second component compartment 26 is provided a bar code reader 24 that reads a bar code printed on or applied to the mixing bag that is wound on the upper and lower kneading drums 12a and 12b.

The drum driver 36 includes a motor 34 that rotates the lower kneading drum 12b, and a belt 32 that transmits a rotary movement of the lower kneading drum 13 to a rotation shaft 38 of the upper kneading drum 12a. The bar code reader 24 may move near to, and distantly from, an outer circumference of the upper kneading drum 12b.

On the other hand, the bread maker 1 according to the present invention comprises a rotation sensing part 40 to sense rotation of at least one of the upper and lower kneading drums 12a and 12b.

The rotation sensing part 40 includes a disk part 42 attached to the rotation shaft 38 of the upper kneading drum 12a, and a rotation sensor 44 placed near the disk part 42 that outputs a pulse signal by sensing the rotation of the disk part 42.

The disk part 42 includes a first disk 46 that allows the rotation sensor 44 to sense one revolution of the upper kneading drum 12a, and a second disk 48 that allows the rotation sensor 44 to sense a rotation of the upper kneading drum 12a that is less than one complete turn.

The rotation sensor 44 is used as a pulse generator, and includes light emitting parts that emit a sensing signal such as infrared rays toward the first and second disks 46 and 48, and light receiving parts that face the light emitting parts, respectively, across the first and second disks 46 and 48 and receive the light emitted from the light emitting parts, respectively.

The sensing signal emitted from the light emitting part to the light receiving part is interrupted according as the upper kneading drum 12a rotates, so that the pulse signal is output in a cycle of one complete turn of the upper kneading drum 12a.

It is understood that the rotation sensing part 40 may also comprise a single rotation disc as a circular shaped member and having convex sections and concave sections in the circumference, and a rotation signal sensor having a radiating part and a signal sensing part provided in parallel with the rotation disc interposed therebetween.

The pulse signal is transmitted from the rotation sensor 44 to a controller 56 (to be described later), and then the controller 56 determines a rotated position of the upper kneading drum 12a based upon the pulse signals and controls the drum driver 36 to rotate the upper and lower kneading drums 12a and 12b, thereby adjusting a reciprocating distance of the mixing bag.

Figure 3:
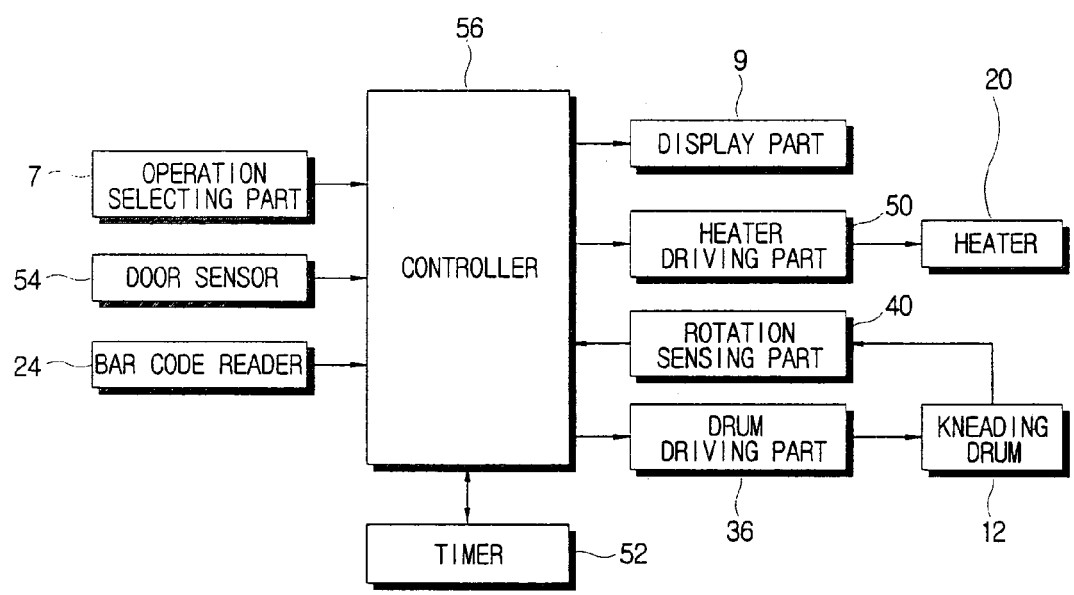
FIG. 3 is a control block diagram of the bread maker according to an embodiment of the present invention.

As shown in FIG. 3, the bread maker 1 according to the present invention further comprises a door sensor 54 to sense whether the door 5 is open or closed, a timer 52 to count elapsed time, a heater driver 50 to turn on the heaters 20, and the controller 56 to control the door sensor 54, the timer 52 and the heater driver 50.

The door sensor 54 is preferably a switch interlocked with opening and closing of the door 5, and therefore outputs a signal to the controller 56 in response to the opening and closing of the door 5.

The timer 52 counts the time elapsed since the door 5 is opened, and transmits counted time information to the controller 56.

The controller 56 controls the drum driver 36 to turn on the motor 34 to partially wind the mixing bag attached to the kneading drums 12 on the kneading drum 12 when a user selects a bar code reading operation through the operation selecting part 7. As the mixing bag is wound on the kneading drum 12, the bar code reader 24 reads the bar code printed or applied on the mixing bag. On the basis of the bar code that includes information on kneading time, leavening time, leavening temperature, baking time, baking temperature, etc., for a particular recipe, which is read by the bar code reader 24, the controller 72 controls the drum driver 36 to rotate the kneading drums 12 so as to knead the dough contained in the mixing bag, and controls a heater driver 70 to turn on the heaters 20 so as to leaven and bake the dough.

When the controller 56 determines that the door 5 is open while the bread maker 1 operates based on the signal from the door sensor 54, the controller 56 controls the drum driver 36 and the heater driver 70 to respectively suspend the kneading drum 12 and the heater 20. At the same time, the controller 56 controls the display part 9 to display a message warning a user that the door 5 is open. Hence, when the door 5 is open while the bread maker operates, the kneading drum 12 and the heater 20 are suspended, thereby increasing safety and decreasing loss of heat and electrical energy.

In the above-described embodiment, the display part 9 is employed to display the message to warn a user that the door 5 is open. However, to warn a user that the door 5 is open, a buzzing sound may be used with or without the display part 9. In this case, the bread maker 1 comprises a sound circuit and a speaker, and the controller 56 controls the sound circuit to make the buzzing sound through the speaker, thereby warning a user that the door 5 is open.

Further, when the controller 56 determines that a predetermined time elapses since the door 5 is opened based on the counted time information from the timer 52, the controller 56 controls the heater driver 50 and the drum driver 36 to stop the heaters 20 and the kneading drum 12. At this time, if it is determined that the mixing bag is wound on the kneading drums 12, the controller 56 controls the mixing bag to be released from the kneading drums 12. That is, the controller 56 controls the lower kneading drum 12b to rotate in a direction of releasing the lower end of the mixing bag from the lower kneading drum 12b, and then controls the upper kneading drum 12a to rotate to an initial holding position allowing a user to readily remove the upper end of the mixing bag from the upper kneading drum 12a. Thus, the bread maker is stopped and returned to an initial state. Further, a warning message of the predetermined time out is displayed on the display part 9, thereby letting a user know that the bread maker 1 is stopped. Additionally, a buzzing sound may be made by a speaker with or without the warning message of the display part 9.

Further, when the controller 56 determines that the door 5 is closed within the predetermined time elapsed after the door 5 is opened on the basis of the counted time information from the timer 52 and the signals from the door sensor 54, the controller 56 controls the heater driver 50 and the drum driver 36 to restart the heaters 20 and the kneading drum 12.

Here, the controller 56 comprises a memory to store information on the rotated position of the kneading drum 12 sensed by the rotation sensing part 40 when the kneading drum 12 is suspended. Therefore, when the controller 56 determines that the door 5 is closed, the controller 56 controls the drum driver 36 to restart the kneading drum 12 from the rotated position based on the information stored in the memory.

Further, in a normal state, the heater 20 is continuously operated during a predetermined period of heating time. However, the predetermined period of heating time goes on even though the heater 20 is suspended while the door 5 is open, so that the heating time for the bread is shortened and the bread is not completely baked. Thus, the controller 56 controls the operating time of the heater 20 to be prolonged as long as the time that the door 5 is open.

Figure 4:
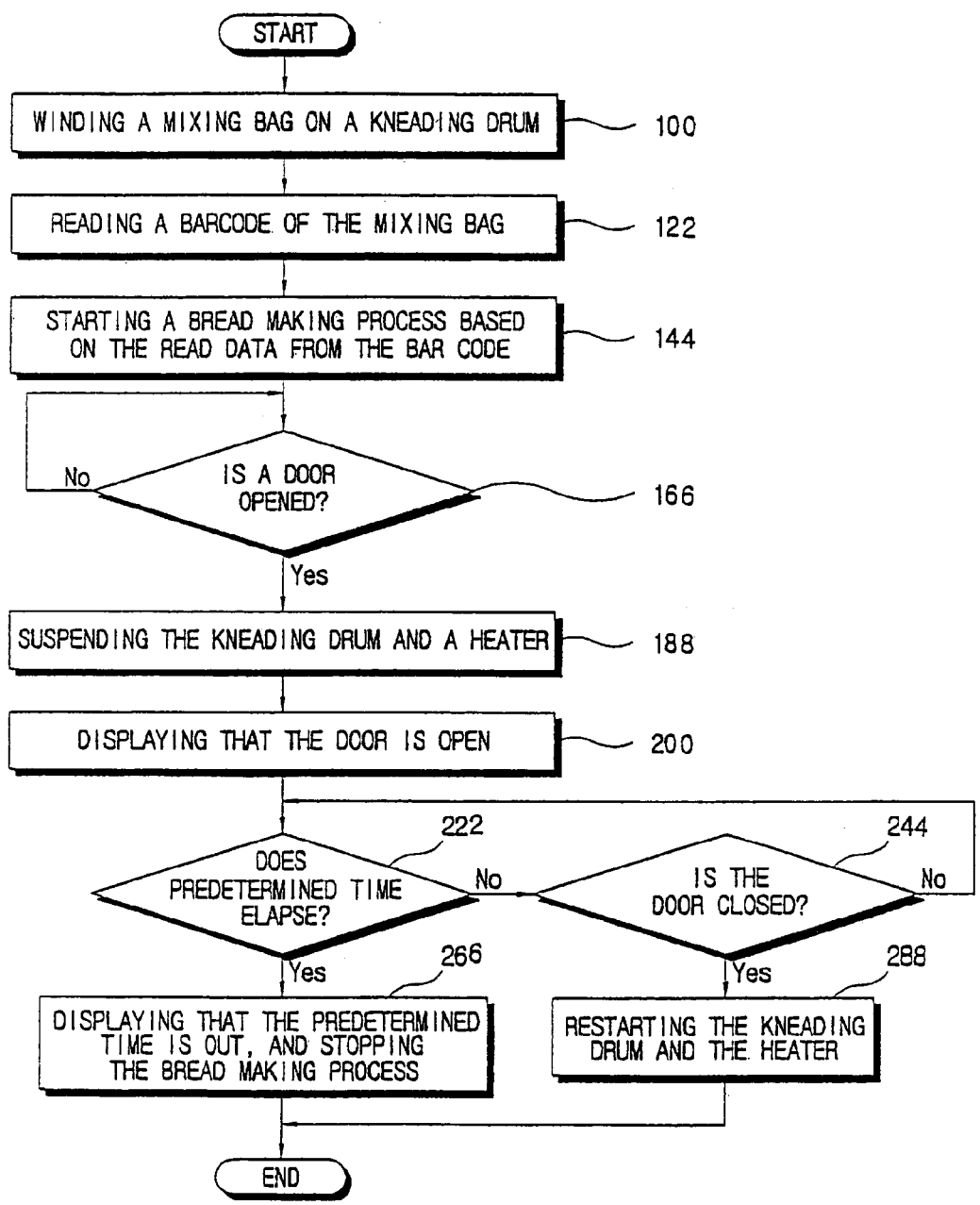
FIG. 4 is a control flowchart of the bread maker according to an embodiment of the present invention.

As shown in FIG. 4, the bread maker 1 according to the present invention operates as follows. At operation 100, the mixing bag is wound on the kneading drum 12 so as to allow the bar code reader 24 to read the bar code printed or applied on the mixing bag. At operation 122, the controller 56 receives the read data from the bar code reader 24. At operation 144, the controller 56 controls the drum driver 36 and the heater driver 70 to drive the kneading drum 12 and the heater 20 to knead and bake the dough, respectively.

At operation 166, the controller 56 determines whether the door 5 is open or closed on the basis of the signal from the door sensor 54 while the dough is kneaded or baked. When the controller 56 determines that the door 5 is open, the controller 56, at operation 188, respectively controls the drum driver 36 and the heater driver 50 to suspend the kneading drum 12 and the heater 20, and, at operation 200, controls the display part 9 to display a message warning a user that the door 5 is open.

At operation 222, the controller 56 determines whether or not the predetermined time elapses since the door 5 is opened on the basis of the counted time information from the timer 52. When the controller 56 determines that the predetermined time elapses since the door 5 is opened, at operation 266, the controller 56 controls the kneading drum 12 to rotate in a direction of releasing the mixing bag from the kneading drums 12, controls the heater driver 50 and the drum driver 36 to stop the heaters 20 and the kneading drum 12, and controls the display part 9 to display the warning message of the predetermined time out.

At operation 244, the controller 56 determines whether or not the door 5 is closed within the predetermined time elapsed after the door 5 is opened on the basis of the counted time information from the timer 52 and the signals from the door sensor 54. When the controller 56 determines that the door 5 is closed within the predetermined time, the controller 56 controls 56 controls the heater driver 50 and the drum driver 36 to restart the heaters 20 and the kneading drum 12, respectively 288. The restarted heaters 20 and the kneading drum 12 then operate until the interrupted bread making process is completed by taking into account the time remaining in the bread making process and any negative effects of the interruption.

As described above, the present invention provides a bread maker and a method of controlling the same, which can suspends heaters and kneading drums when a door is open while the bread maker operates, thereby increasing safety and decreasing loss of heat and electrical energy.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of controlling a bread maker comprising a main body having an oven compartment with a front opening, a door to open and close the front opening of the oven compartment, a pair of kneading drums spaced apart from each other inside the oven compartment and winding a mixing bag filled with ingredients for bread thereon, a drum driver driving the kneading drums to rotate, a heater heating the inside of the oven compartment, and a heater driver driving the heater to operate, the method comprising:
   sensing whether the door is open or closed;
   controlling the drum driver and the heater driver to suspend the kneading drums and the heater, respectively, when the door is open; and
   controlling the heater driver and the drum driver to restart the heaters and the kneading drums, respectively, when the door is closed within a predetermined time elapsed since the door is opened.

2. The method according to claim 1, further comprising displaying a warning message that the door is open when the door is open.

3. The method according to claim 1, further comprising displaying a warning message that the predetermined time is passed when the predetermined time has elapsed.

4. The method according to claim 1, further comprising controlling the kneading drums to rotate in directions which release the mixing bag from the kneading drums when a predetermined time has elapsed since the door is opened.

5. The method according to claim 2, further comprising controlling the kneading drums to rotate in directions which release the mixing bag from the kneading drums when a predetermined time has elapsed since the door is opened.

6. The method according to claim 3, further comprising controlling the kneading drums to rotate in directions which release the mixing bag from the kneading drums when the predetermined time has elapsed.

7. A method of controlling a bread maker, comprising:
   starting a bread making process, including operations of kneading drums and a heater, based on inputted information;
   suspending the operation of the kneading drums and the heater inside the bread maker, if a door is determined to be open;
   determining whether to end the bread making process based on a length of time the door is determined to remain open,
   wherein the determining comprises determining whether a predetermined time has elapsed while the door is open.

8. The method according to claim 7, further comprising:
   determining if and the extent to which the mixing bag is wound on the kneading drums;
   controlling the kneading drums to rotate in releasing directions; and
   further controlling the kneading drums to rotate into an initial holding position from which the mixing bag can be removed from the kneading drums.

9. The method according to claim 8, further comprising restarting the kneading drums and the heater if the door is closed before the predetermined time has not elapsed.

10. The method according to claim 9, wherein the restarting comprises operating the kneading drums and the heater during the remaining bread making process time.

* * * * *